(12) United States Patent
Nagel et al.

(10) Patent No.: US 11,326,631 B2
(45) Date of Patent: May 10, 2022

(54) ASSEMBLY OF A SCREW CONNECTION

(71) Applicant: Bayerische Motoren Werke Aktiengesellschaft, Munich (DE)

(72) Inventors: Sascha Nagel, Munich (DE); Robert Weinmann, Rammingen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/864,504

(22) Filed: May 1, 2020

(65) Prior Publication Data
US 2020/0256361 A1    Aug. 13, 2020

Related U.S. Application Data

(63) Continuation of application No. PCT/EP2018/075611, filed on Sep. 21, 2018.

(30) Foreign Application Priority Data

Nov. 2, 2017   (DE) .................. 10 2017 219 477.4

(51) Int. Cl.
    *F16B 5/02*    (2006.01)
(52) U.S. Cl.
    CPC ...................... *F16B 5/02* (2013.01)
(58) Field of Classification Search
    CPC ............ B25B 23/1425; B25B 23/1456; B25B 23/147; B25B 23/1475; B25B 23/14; Y10T 29/49764; Y10T 29/49767; Y10T 29/49771; Y10T 29/4978
    See application file for complete search history.

(56) References Cited

U.S. PATENT DOCUMENTS

| | | | |
|---|---|---|---|
| 5,517,742 A | 5/1996 | Mann | |
| 6,351,997 B1 | 3/2002 | Loeffler | |
| 6,490,952 B2 | 10/2002 | Junkers | |
| 7,702,493 B2 * | 4/2010 | Carlin | B23P 19/066 703/7 |

FOREIGN PATENT DOCUMENTS

| | | |
|---|---|---|
| CN | 1102869 A | 5/1995 |
| CN | 1283539 A | 2/2001 |
| CN | 104863949 A | 8/2015 |

(Continued)

OTHER PUBLICATIONS

English translation DE19723899 (Year: 1998).*

(Continued)

*Primary Examiner* — Jason L Vaughan
*Assistant Examiner* — Amanda Kreiling
(74) *Attorney, Agent, or Firm* — Crowell & Moring LLP (57) ABSTRACT

A method and a system for assembling a screw connection for a predefined operating load. The system includes a detector configured to detect values of at least one influence factor on the screw connection, a calculator configured to determine, based on the operating load, a required pretensioning force of the screw connection, and, based on the determined pretensioning force, to determine an expression of at least one assembly parameter, and an assembler configured to assemble the screw connection in accordance with the determined expression of the assembly parameter.

7 Claims, 3 Drawing Sheets

(56) References Cited

FOREIGN PATENT DOCUMENTS

| DE | 43 11 956 A1 | 10/1994 | | |
|----|----|----|----|----|
| DE | 197 23 899 A1 | 12/1998 | | |
| DE | 19723899 A1 | * 12/1998 | ............ | B25B 23/14 |
| DE | 198 19 301 C1 | 12/1999 | | |
| DE | 10 2005 003 066 A1 | 8/2006 | | |
| DE | 10 2005 011 074 A1 | 9/2006 | | |
| EP | 0 914 910 A1 | 5/1999 | | |

OTHER PUBLICATIONS

PCT/EP2018/075611, International Search Report dated Jan. 16, 2019 (Two (2) pages).
German Search Report issued in German counterpart application No. 10 2017 219 477.4 dated Sep. 20, 2018, with Statement of Relevancy (Seven (7) pages).
Büyükbay et al., "Cleaner production application as a sustainable production strategy, in a Turkish Printed Circuit Board Plant", *Resources, Conservation & Recycling*, Jan. 1, 2010, pp. 744-751, XP055539527.
Chinese Office Action issued in Chinese application No. 201880056164.2 dated Mar. 3, 2021, with English translation (Fourteen (14) pages).

* cited by examiner

ASSEMBLY OF A SCREW CONNECTION

CROSS REFERENCE TO RELATED APPLICATIONS

This application is a continuation of PCT International Application No. PCT/EP2018/075611, filed Sep. 21, 2018, which claims priority under 35 U.S.C. § 119 from German Patent Application No. 10 2017 219 477.4, filed Nov. 2, 2017, the entire disclosures of which are herein expressly incorporated by reference.

BACKGROUND AND SUMMARY OF THE INVENTION

The invention relates to a method and a system for assembling a screw connection provided for a predefined operating load.

When designing screw connections a pretensioning force is normally determined—for example by the construction or development department charged with this task—which has to be applied to the screw connection during assembly, so that this can provide reliable support if the envisaged (combination of) operating load(s) occurs(occur).

The pretensioning force must at least be of a sufficient magnitude in order to, apart from the required clamping force for the envisaged operating loads, additionally apply a settling force, which, bit by bit, gets lost to the screw connection after tightening due to settling processes in the connection. Furthermore the amount of pretensioning force must apply a further component, which also, in the end, is invested, not into the clamping force, but for example into friction losses during tightening. Calculation of the required pretensioning force for predefined operating loads is in itself a standard activity when designing screw connections.

When joining (also called tightening or assembling hereunder) the screw connection, the pretensioning force can albeit not be measured directly as a design parameter. Therefore auxiliary variables are used during assembly for making, monitoring and for quality assurance of the tightening of the respective screw connection.

Auxiliary variables used are typically a tightening torque and a tightening angle of a screw rather than of, for example, a nut of the screw connection. These two auxiliary variables are plotted against one another in a diagram—the screwing process curve.

Frequently a so-called 'green window' is determined for a certain screw connection, the outer limits of which are defined in the screwing process curve by an upper and a lower threshold value for the tightening torque and by an upper and a lower threshold value for the tightening angle.

The threshold values are for example determined by means of tests, in which, for example, it is checked by means of a further tightening torque measurement, whether the required pretensioning force determined at the design stage is achieved for a certain combination of reached tightening torque and reached tightening angle.

However, the significance of the further tightening torque measurement as regards a value for the pretensioning force is disputed because a plurality of influence factors can impact on the result of the further tightening torque measurement, so that it often strongly depends on the experience of the person taking the measurement, as to whether the conclusion of the test result drawn as to the pretensioning force present is sufficiently close so as to be accurate.

Moreover, process qualification and quality monitoring, in particular in highly automated manufacturing environments with a plurality of different screw connections such as, for example, in automobile manufacture, is very time-consuming and personnel-intensive.

The fact that with screw connections the design parameter (pretensioning force) deviates from the process control parameters (tightening torque, tightening angle) during assembly and that these parameters can be set into relation with one another only under the effect of a plurality of influence factors, makes it difficult to achieve an efficient information flow between development/design on the one hand and production/assembly on the other for component parts with screw connections.

It is therefore an objective of the invention to provide an improved method and an improved system for assembling a screw connection provided for a predefined operating load.

According to one aspect of the invention a method for assembling a screw connection provided for a predefined operating load is proposed, comprising the steps of: a) determining a required pretensioning force of the screw connection in dependence of the operating load, b) determining a nominal expression of at least one, in particular of two or more assembly parameters, in particular a tightening torque and/or a tightening angle, in dependence of the required pretensioning force, c) recording at least one value of at least one, in particular of a plurality of influence factors on the screw connection, in particular on the friction ratios of the screw connection, d) determining a set expression of the assembly parameter on the basis and/or in dependence of the nominal expression and in dependence of the recorded value of the influence factor, e) tightening the screw connection until the set expression of the assembly parameter has been reached.

According to a further aspect of the invention a system for assembling a screw connection provided for a predefined operating load is proposed, comprising: A) a recording means, which is configured to record values of at least one influence factor on the screw connection, B) a calculation means, in particular comprising a control means and/or a storage means, which is configured i) to determine a required pretensioning force of the screw connection in dependence of the operating load, and ii) to determine an expression of at least one assembly parameter in dependence of the required pretensioning force, and C) an assembly means, which is configured to assemble the screw connection in accordance with the determined expression of the assembly parameter. In addition the calculation means is configured to adjust the determined expression of the assembly parameter prior to assembly in dependence of a recorded value of the influence factor.

The invention is based, among others, on the recognition that it is only possible in an efficient manner to draw conclusions from a provided operating load of a screw connection, via the pretensioning force determined in a standard manner as a design parameter, on the suitable threshold values of the typically used process control parameters of tightening torque and tightening angle, if a possibility is found for taking into account in an appropriate manner, the (usually many and in a complex manner inter-related) influence factors and their influence on the relationship between design parameter and process control parameters.

The invention is based, among others, on the idea, to revert back in a first step for screw connections to be designed, to a simple computing model for calculating screw connections, which model, for a known operating load, initially yields the required pretensioning force and on this basis permits to determine a nominal expression of the process control parameters (in other words the assembly parameters).

The required pretensioning force can be determined from the provided operating load via formulae found in reference books or relevant collections of formulae. A first simple computing model for determining the suitable nominal expression of the assembly parameters on the basis of the determined pretensioning force can be set up, for example, via a regression model from value pairs obtained by querying experienced assembly workers. For this case as well, simple computing models are available in many companies, albeit by disregarding many relevant influence factors.

In order to arrive from the possibly inaccurate nominal expression of the assembly parameters (inaccurate because determined in a simplified manner) at a more accurate result—a set expression of the assembly parameters—current values of at least one influence factor (preferably however several or precisely the relevant influence factors) are recorded in terms of the invention. The recording means for recording values of an influence factor is for example a suitable sensor, a suitable input method and/or a database query. In view of the multitude of application-specific possibly relevant influence factors it is left to the expert to choose an expedient recording means in the individual case.

Depending on how the value of an influence factor is expressed, it has an impact, based on the nominal expression, on how much the set expression deviates from the nominal expression. Preferably this impact manifests itself in that an adjustment contribution assigned to a certain value of a certain influence factor, for example in a table which can be made available in a storage means of the calculation tool.

According to one embodiment an adjustment factor is determined from the adjustment contributions which result from the respectively recorded value of different influence factors, with this adjustment factor being used for determining the set expression from the nominal expression.

The tightening of the screw connection itself can then be performed by way of a set expression of the assembly parameters, which takes relevant influence factors distinctly more accurately into account. Consequently it is possible to assemble screw connections in terms of the invention, the assembly parameters of which are expressed in such a manner that they arrive at a distinctly more accurate value for the required pretension. Moreover during assembly trial-and-error loops for example can be omitted during process qualification.

In one embodiment of the invention, the relevant data is used during executing the method for improving the system, so that the system can be configured as a learning system. To this end an empirical data record is created and stored during execution, in which preferably the predefined operating load, the determined pretension of the screw connection and/or the values of the observed influence factors as well as the nominal expression(s) and/or the set expression(s) of the assembly parameter(s) are contained and/or set in relation to one another. Preferably the set expression of at least one assembly parameter is determined in dependence of at least one, preferably of a plurality of empirical data records, wherein the empirical data records are preferably used when comparing the recorded value to stored values of the influence factor and the associated assignment of the influence factor.

Using this procedure it is possible (in particular as more and more empirical data records accumulate) to gradually achieve, as required, a kind of screwing process curve simulation, in which the screwing process curves and the threshold values for quality assessment can be virtually created at a very early point in time in the production development process and be passed on to an assembly robot, for example.

Furthermore the internal safeguarding cycles of development and production can be synchronized. A common consistent database can be created, in which the design parameters and the process control parameters are quantitatively set in relation to one another across all relevant influence factors. There is then no longer any need for subsequently empirically determining the determined threshold values for the expression of the assembly parameters as they then relate directly to the design parameters. In the ideal situation a physical check such as for example a further tightening torque measurement can then also be omitted.

According to one embodiment an adjustment factor regarding the assembly parameter is assigned to the recorded value of the influence factor, in dependence of which the set expression is determined on the basis of the nominal expression. As a result the influence of a certain value of an influence factor can be quantified. The term 'factor' is to be understood here in a wider sense, in particular not only in terms of a multiplication.

In particular the adjustment factor is determined by comparing the recorded value of the influence factor to stored values of the influence factor, each of which has assigned to them an adjustment contribution regarding the assembly parameter, and wherein the recorded value has assigned to it the adjustment contribution of a matching stored value.

In order to be able to map the influence of several influence factors in a suitable manner, one value each is recorded for several influence factors, and the set expression of the assembly parameter is determined in dependence of the respective value of in particular these several influence factors. The influence factors can mutually influence each other in different ways; in particular the adjustment contribution assigned to a value of a first influence factor can depend on a value of a second influence factor.

According to one embodiment set expressions for several assembly parameters are determined, in particular for a tightening torque and for a tightening angle. Thus typical screwing process curves can be derived in a simple manner for industrial manufacturing environments, for example in tightening-torque-controlled or tightening-angle-controlled screwing operations.

Influence factors will be presented and described in more detail below by way of example and without any claim of completeness, which in different cases of application, individually or in combination with any or all of the types of described influence factors, may impact upon an adjustment of the expression of the assembly parameters.

Accordingly, in one embodiment, the influence factor recorded in particular by means of a sensor, an input means and/or a database query is one of the factors described hereunder. Each of the influence factors described may refer to one, to several or to all component parts of the screw connection. Component parts of the screw connection are for example thread components such as screw(s) and/or nut(s) of the screw connection and/or one or several of the screwed sheet metal parts.

Geometric design influence factor: certain external and/or internal dimensions of the screwed components may have an impact on the settling behavior of the screw connection and therefore require an adjusted (i.e., larger) pretension. Such an influence factor could for example be recorded by means of an imaging sensor, possibly with feature recognition. For example thread dimensions of the thread components may impact on the friction ratios within the thread pairing. Such an influence factor could for example be recorded by means of a database query about the thread components used.

Surface roughness influence factor: an example for this are the metal surfaces of the screwed components, the surface roughness of which impacts, both in the pairing with the bottom of the screw head and/or the nut head, on the friction ratios of the screw connection and also on the boundary surface of the two sheet metal parts itself. Such an influence factor could for example be recorded by means of a high-resolution laser sensor.

Coating influence factor: a surface coating of one of the components may also impact on the friction ratios of the screw connection. A certain type of coating could for example be recorded by means of a keypad or a touch input, or possibly also via a suitable sensor.

Raw material influence factor: the raw materials from which the screwed components are made may also have an impact on the friction ratios of the screw connection, in particular in interaction with the raw material of another one of the components. This influence factor may for example be recorded by means of a database query about the components used or by means of a manual input. A raw material pairing as influence factor may therefore be relevant in particular as regards the friction coefficient of the raw material pairing. An existing value of this influence factor in an application case could for example be automatically ascertained by the system (on the basis of the used components), but could also be input manually.

Condition influence factor: a degree of soiling present in an application case, e.g., through dirt, such as dust or grease, just as a deliberately applied coating, may also have an impact on the friction ratios of the screw connection. This influence factor may, for example, be recorded by a high-resolution image sensor with pattern recognition.

In addition a plurality of further influence factors may be potentially relevant in that they impact on the interdependencies between the pretensioning force and the assembly parameters. These are listed below merely as groups and not explained in more detail: joining parameters (expansion, stretching limit, tensile strength, downthrust, thread length, clamping length), sensor system (calibration, adjustment, measuring transducer, damage, scanning rate), parameterization (accuracy, conditioning), software (control), production (dimensional tolerance), ergonomics (aids, support, counterholders, accessibility), construction (add-on components), screwing process (measuring method, measuring errors, rpm, torque control, tightening method, method of screwing, switch-off behavior, process safety, alignment), hardware (quality, stiffness), screw-fitter (reliability, error detection, care, machine handling, time pressure), climate (temperature, air humidity, air pressure).

According to one embodiment the value of at least one influence factor is determined by way of a list of possible expressions of the influence factor. This can also be used for recording values of influence factors which are difficult to quantify.

In order to basically be able to consider values of most widely varying types of influence factors, according to one embodiment the value of at least one influence factor is recorded by means of a respectively suitable recording means. In particular a value is measured by means of a suitable sensor (6)/a suitable sensor arrangement and/or entered by means of a suitable input means such as a keypad or through touchscreen operation and/or retrieved by means of a suitable database query from a storage means.

Further features, advantages and application options of the invention are revealed in the description hereunder in conjunction with the Figures.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
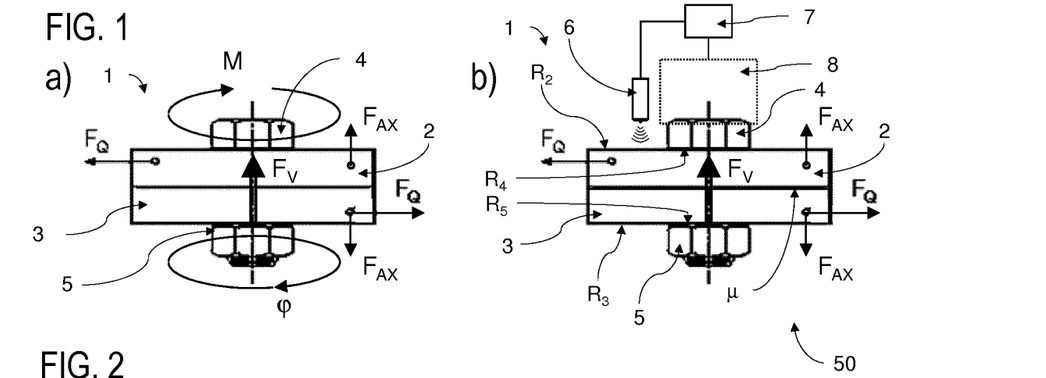
FIG. 1 shows a system as per an exemplary embodiment of the invention with an exemplary screw connection, in two lateral sectional views along the same cutting line.

For better clarity of the depiction FIG. 1 has been divided into FIG. 1a and FIG. 1b. In FIG. 1a the screw connection 1 is depicted, in particular showing the active forces, torques and assembly parameters, in FIG. 1b the screw connection is depicted, in particular showing the system 50 and its components.

In all, an exemplary screw connection 1 is depicted in FIG. 1. A first metal sheet 2 or second metal sheet 3 are screwed together by means of the screw 4 and the counternut 5. The operating load in the example is an axial force F A X engaging eccentrically to the screw axis and a transverse force F Q. In order to raise the required clamping force (plus settling force and other additional forces), the screw 4 is screwed together with the nut 5 using a tightening torque M. To this end the screw 4 and the nut 5 are twisted about a tightening angle φ.

When the desired tightening torque is reached using the desired tightening angle, the desired pretensioning torque FV is present at the screw connection 1. With an exemplary embodiment of the method it is provided that the screw 4 and the nut 5 are twisted about a tightening angle $\varphi_{E,SOLL}$ with a final tightening torque $M_{A,SOLL}$. The manner, in which these expressions are determined, is explained in more detail by way of the description of FIGS. 2 to 5.

FIG. 1b depicts a system 50 for assembling a screw connection provided for a predefined operating load according to an exemplary embodiment of the invention.

The system 50 comprises a recording means 6, which is configured as a surface sensor with image capture for recording values 310 (see FIG. 4) of a surface roughness R2 of the metal sheet 2 and a surface roughness R3 of the metal sheet 3. In addition the system 50 comprises, as further recording means not shown, at least one input means such as a keypad and the option of database queries. The input means may be used to record, for example, values 320 (see FIG. 4) relating to raw material pairing of the metal sheets; a database query may be used to record, for example, values 330 (see FIG. 4) relating to the surface condition R4, R5 of the respective head bottom of the screw 4/the nut 5.

In addition the system 50 comprises a calculation means 7, which is for example configured as a desktop computer or as an industrial control with a screen interface. The calculation means 7 is configured to determine a required pretensioning force FV in dependence of the operating load and to determine, in dependence of the determined pretensioning force, a nominal expression $M_{A, NENN}$, $\varphi_{E, NENN}$ of the assembly parameters of tightening torque M and tightening angle φ respectively. Moreover the calculation means 7 is configured, in dependence of recorded values 310, 320, 330 of different influence factors $R_{2-5}\mu$, to determine a set expression $M_{A,SOLL}$, $\varphi_{E,SOLL}$ of the assembly parameters. Exemplary functions of the calculation means 7 are described in more detail with reference to FIGS. 4 and 5.

The system 50 further comprises an assembly means 8 (shown only schematically by a dotted line), which in the exemplary embodiment is configured as an industrial robot with a tightening-torque-controlled and/or tightening-angle-controlled screw head. The assembly means 8 may however also be a hand-controlled screw head connected to the calculation means 7. Using the assembly means 8 the screw connection can thus be assembled, i.e., tightened according to the requirements in the system 50.

Figure 2:
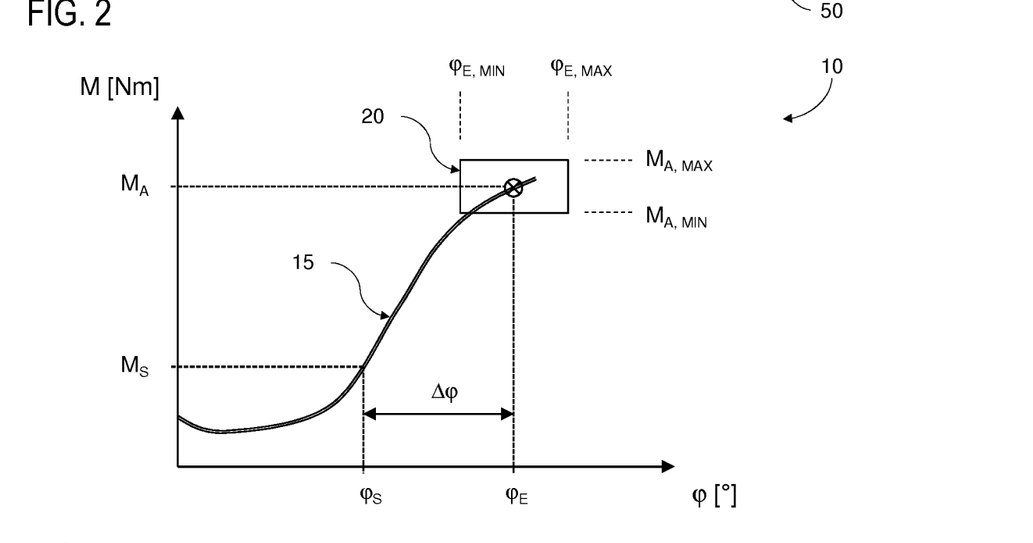
FIG. 2 shows a diagram with a screwing process curve, in which a 'green window' of the screwing process curve is plotted in terms of a nominal expression of two assembly parameters.

FIG. 2 shows a diagram with a conventional screwing process curve, in which a 'green window' 20 of the screwing process curve is plotted in terms of a nominal expression $M_A$, $\varphi_{N, NENN}$ of the two assembly parameters M, φ. The green window frames the range between the upper threshold values $M_{A, MAX}$, $\varphi_{E, MAX}$ and the lower threshold values $M_{A, MIN}$, $\varphi_{E, MIN}$. Within this range, which can be monitored without problems for its adherence by means of internal sensors of the assembly means, the screwing process must end, so that the nominal expression is achieved. With the exemplary curve 15 shown, a successively rising tightening torque M is applied during the screwing process as from a threshold torque MS for a certain angle difference Delta PHI, until in the range between angles $\varphi_{E,MIN}$ and $\varphi_{E,MAX}$—given the case that screwing is performed according to requirements—a tightening torque between $M_{A,MIN}$ and $M_{A,MAX}$ is achieved and the screwing process is finished (see circle with x in FIG. 2).

The green window 20 of FIG. 2 has for example been determined by means of an experience-based estimate of an experienced screw-fitter after several iterations with further tightening torque measurements. Alternatively it may also have been determined as per process step 200 in a process according to an exemplary embodiment of the invention with a simplifying calculation method.

Figure 3:
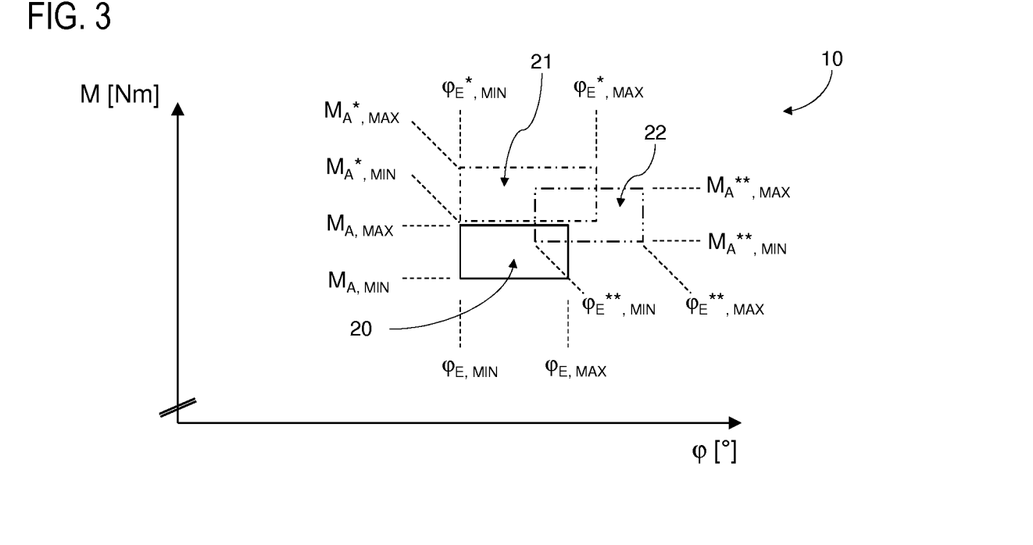
FIG. 3 shows the diagram of FIG. 2, wherein additionally adjusted 'green windows' of the screwing process curves have been plotted in terms of two exemplary set expressions of the assembly parameters.

FIG. 3 on the other hand shows the diagram of FIG. 2, wherein additionally adjusted 'green windows' 21 and 22 of the screwing process curves are plotted in terms of two exemplary set expressions $M_{A, SOLL}$, $\varphi_{E, SOLL}$ of the assembly parameters. The corresponding threshold values of the green windows 21 and 22 are marked with */** in order to differentiate between the set expressions and the nominal expressions of the green window 20.

The depiction of FIG. 3 shows in summary, how in this exemplary embodiment starting from the nominal expression (see green window 20), different set expressions (see green windows 21 and 22) can deviate. For example the green window 21 has been moved upwards as regards the set expression for the tightening torque $M_A^*$ and comprises a larger tolerance range towards the maximum value as regards the set expression $\varphi_E^*$. For example the green window 22 has been moved upwards as regards both set expressions $M_A^{}$ and $\varphi_E^{}$ for the minimum values and for the maximum values. The depicted moves are in particular the result of executing the method according to an exemplary embodiment of the invention, as will now be described with reference to FIG. 4.

Figure 4:
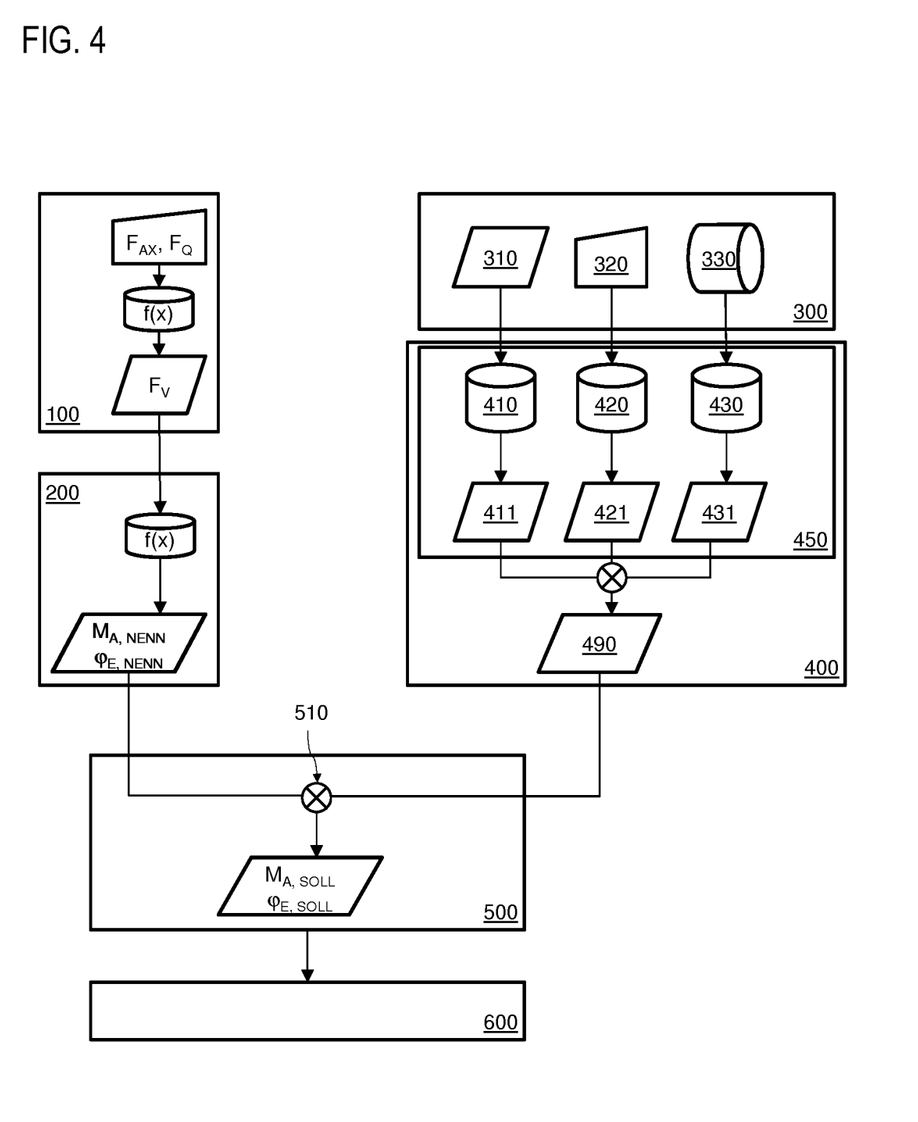
FIG. 4 shows a method as per an exemplary embodiment of the invention in a schematic view of the method steps.

FIG. 4 shows a process according to an exemplary embodiment of the invention in a schematic depiction of the process steps. The exemplary embodiment shown is based on a screw connection, the design parameter of which is the pretensioning force and the control variables of which, during assembly, are the tightening torque and the tightening angle. To aid understanding, only the influence factors listed for FIG. 1 from a plurality of relevant influence factors have been used for explaining the individual process steps. The operating load to which the screw connection to be assembled shall be exposed, comprises the combination of operating loads as per FIG. 1 and is assumed to be predefined.

In process step 100 a pretensioning force FV required as a minimum is determined in dependence of the operating load F A X, FQ by means of the calculation means 7. The calculation model required for this is picked, with operation-specific adjustments, from a collection of formulae for screw connections (depicted as f(x) in 100).

In process step 200 nominal expressions are determined from the ascertained pretensioning force FV for the tightening torque $M_{A,NENN}$ and the tightening angle $\varphi_{E,NENN}$, wherein additionally maximum values and minimum values are determined in terms of a derivation of a green window 20. To this end an experience-based computing model is used, in which suitable expressions are derived via the creation of regression functions from empirical values of expert screw-fitters.

Taking account of different influence factors begins with process step 300: in each case a value for the surface roughnesses R2 and R3 is recorded with the aid of sensor 6. The user of the system (normally the designer for the screw connection 1, but he/she may also be the screw-fitter) inputs the raw materials of metal sheets 2 and 3 via a keypad, from which, in the exemplary embodiment, the calculation unit 7 ascertains the friction coefficient id. When the designer designs the screw connection 1, a database query is also automatically activated by the calculation unit 7, which as a result returns among others the surface roughness R4 and R5 of the head bottom of both the screw 4 and the nut 5. Thus a value is recorded for each of the influence factors R2, R3, R4, R5 and μ.

In process step 450 each of these values is compared in comparisons 410, 420 and 430 to a table associated with the value. This includes in each case determining an adjustment contribution 411, 421, 431 for the recorded value.

Depending on the programming logic on which the calculation means 7 is based, individual adjustment contributions 411, 421, 431 are merged in a suitable manner to form one overall adjustment factor 490.

In process 500 the determined nominal expressions of the assembly parameters are then used as the basis and—again depending on the programming logic of the calculation means 7—adjusted in a suitable manner according to the adjustment factor 490. The result of the adjustment are the set expressions of the assembly parameters, from which then adjusted green windows (see e.g., depiction of the green windows 21 and 22 in FIG. 3) can be derived. The screw connection 1 is then assembled in process step 600 in accordance with the ascertained adjusted green window.

Figure 5:
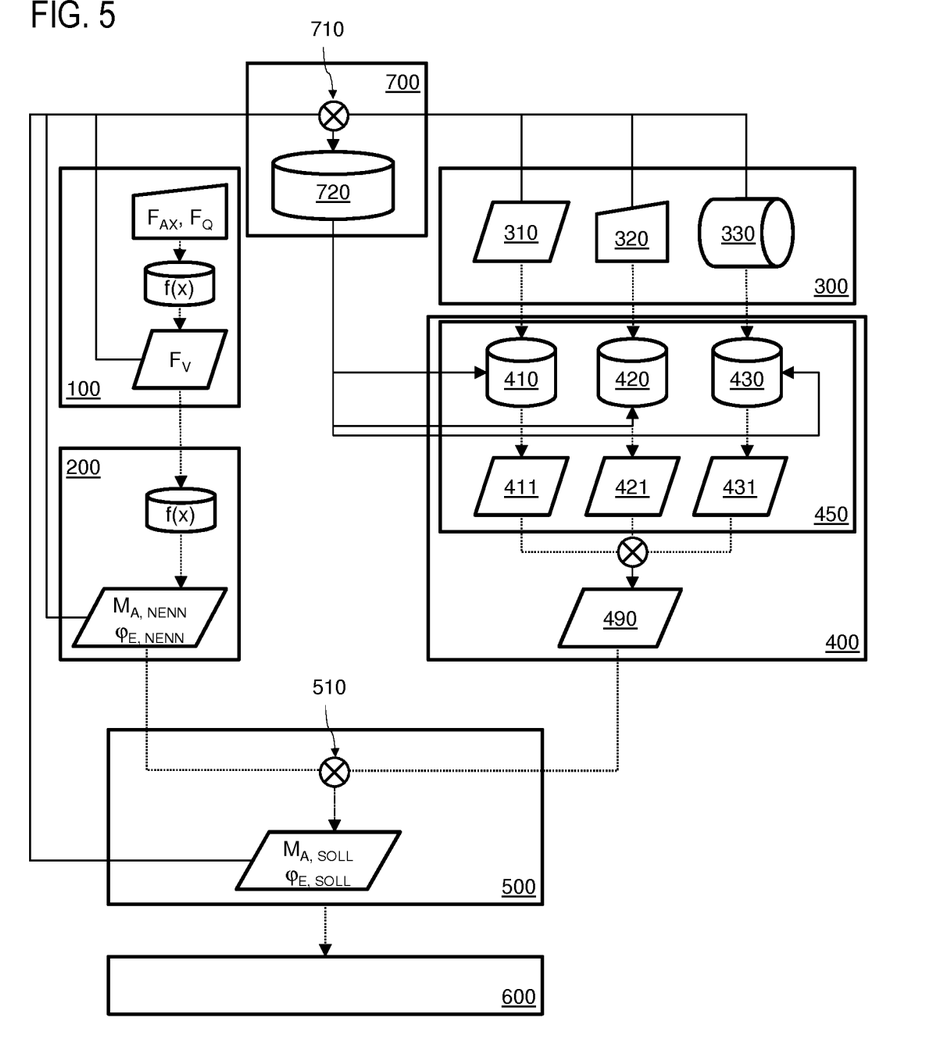
FIG. 5 shows a method as per a further exemplary embodiment of the invention, wherein additional steps are shown in relation to the method as per FIG. 4.

In FIG. 5 a process is described according to a further exemplary embodiment of the invention, wherein the process as per FIG. 5 is different from the process of FIG. 4 essentially in that it contains additional steps following on from process step 500, which allow the system 50 to be learnt with regard to the characteristics of the presently observed screw connection 1.

In process step 700, during or after carrying out the calculations for screw connection 1, the nominal expressions from process step 200, the set expressions from process step 500, the pretension and, if required, also the operating loads from process step 100 as well as the recorded values 310, 320, 330 of influence factors $R_2$, $R_3$, $R_4$, $R_5$, and μ from process step 300 are merged (see merger 710) and stored in a storage means of the calculation means 7.

From the merged data an empirical data record 720 is created in the storage means, which, among others and in particular permits, for future process curves analogue FIG. 4, to assign an improved adjustment contribution to the then recorded values of the corresponding influence factors. To this end the calculation unit 7, when processing the new empirical data record 720 from the data stored in there, determines via suitable multivariate calculation methods a suitable adjustment contribution in each case for each value of an influence factor in the data record 720.

If required, an already previously stored adjustment contribution must be adjusted for a certain value of a certain influence factor. A suitable prioritization of the old and the new adjustment contribution may be effected automatically by means of the calculation unit 7 or manually by means of a request to the user.

The empirical data record 720 is stored in this form in the calculation unit 7 such that it is available for future comparisons with recorded values.

LIST OF REFERENCE CHARACTERS 1 screw connection
2 first metal sheet
3 second metal sheet
4 screw
5 nut
6 recording mans (surface sensor)
7 calculation means
8 assembly means (screwing tool)
10 screwing process curves
15 tightening-torque/tightening-angle curve
20 exemplary nominal window
21 first exemplary set window
22 second exemplary set window
50 system
$F_{AX}$ axial operating load
$F_Q$ transverse operating load
$F_V$ pretensioning force
M applied tightening torque for rotary angle PHI
$M_S$ trigger torque
$M_A$ tightening torque at end of screwing process
φ already tightened rotary angle
$φ_S$ rotary angle at reaching trigger torque
$φ_E$ rotary angle at end of screwing process
R surface roughness
μ friction coefficient between two surfaces
100 process step for determining pretensioning force
200 process step for determining a nominal expression of at least one assembly parameter
300 process step for recording a value of at least one influence factor
310 measured values of surface roughness of metal sheets
320 input of a raw material pairing of the metal sheets
330 database query regarding surface condition of the screw head bottom
400 process step for assigning an adjustment factor
410, 420, 430 comparison of recorded values to stored values
450 process step for comparing recorded and stored values of an influence factor
411, 421, 431 adjustment contribution for each recorded value
490 adjustment factor for all recorded values
500 process step for determining a set expression of the assembly parameter
510 merging the nominal expressions with the adjustment factor
600 process step for tightening the screw connection
700 process step for creating and storing empirical data records
710 create
720 empirical data record The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for assembling a screw connection provided for a predefined operating load, comprising the acts of:
   determining a required pretensioning force of the screw connection in dependence of the predefined operating load;
   determining a nominal expression of an assembly parameter in dependence of the required pretensioning force by a calculation means, wherein the nominal expression is derived via creation of a regression function from empirical values of expert screw-fitters and wherein the assembly parameter is a tightening torque or a tightening angle;
   recording a value of an influence factor impacting the screw connection;
   adjusting the determined nominal expression of the assembly parameter prior to the assembling according to an adjustment factor based on the recorded value of the influence factor to result in a set expression of the assembly parameter; and
   tightening the screw connection until the set expression of the assembly parameter has been reached.

2. The method according to claim 1, wherein, in order to determine the adjustment factor, the recorded value of the influence factor is compared to a stored value of the influence factor which has an adjustment contribution assigned to it with regard to the assembly parameter, and wherein the recorded value has the adjustment contribution of the stored value assigned to it.

3. The method according to claim 1, wherein one value each is recorded for several influence factors and wherein the determined nominal expression of the assembly parameter is determined adjusted in dependence of a respective value of the several influence factors.

4. The method according to claim 1, wherein the value of the influence factor is recorded by a recording means.

5. The method according to claim 1, wherein the influence factor impacting the screw connection is one of:
   a geometry;
   a surface roughness;
   a coating;

a wear;
a raw material;
a raw material pairing;
a friction coefficient of the raw material pairing;
a thread geometry, and
a degree of soiling.

6. The method according to claim 1, wherein an empirical data record is created and stored, in which the determined required pretensioning force, the value of the influence factor, the nominal expression, and the set expression are contained and/or are set into relation with each other.

7. A system for assembling a screw connection provided for a predefined operating load, comprising:
- a recording means which is configured to record a value of an influence factor impacting the screw connection;
- a calculation means which is configured to:
  - determine a required pretensioning force of the screw connection in dependence of the predefined operating load;
  - determine a nominal expression of an assembly parameter in dependence of the determined required pretensioning force, wherein the nominal expression is derived via creation of a regression function from empirical values of expert screw-fitters and wherein the assembly parameter is a tightening torque or a tightening angle; and
  - adjust the determined nominal expression of the assembly parameter prior to the assembling according to an adjustment factor based on a recorded value of the influence factor to result in a set expression of the assembly parameter; and
- an assembly means which is configured to assemble the screw connection in accordance with the set expression of the assembly parameter.

* * * * *